United States Patent
Citriniti et al.

(10) Patent No.: US 10,946,551 B2
(45) Date of Patent: Mar. 16, 2021

(54) METHODS OF IN-LINE EXTRUDATE INSPECTION AND FEEDBACK CONTROL FOR HONEYCOMB BODY MANUFACTURE

(71) Applicant: Corning Incorporated, Corning, NY (US)

(72) Inventors: Joseph Henry Citriniti, Corning, NY (US); Conor James Walsh, Campbell, NY (US)

(73) Assignee: Corning Incorporated, Corning, NY (US)

( * ) Notice: Subject to any disclaimer, the term of this patent is extended or adjusted under 35 U.S.C. 154(b) by 798 days.

(21) Appl. No.: 15/527,958

(22) PCT Filed: Nov. 20, 2015

(86) PCT No.: PCT/US2015/061728
§ 371 (c)(1),
(2) Date: May 18, 2017

(87) PCT Pub. No.: WO2016/085781
PCT Pub. Date: Jun. 2, 2016

(65) Prior Publication Data
US 2017/0355102 A1    Dec. 14, 2017

Related U.S. Application Data

(60) Provisional application No. 62/083,990, filed on Nov. 25, 2014.

(51) Int. Cl.
*B28B 17/00* (2006.01)
*B28B 3/26* (2006.01)
(Continued)

(52) U.S. Cl.
CPC .......... *B28B 17/0072* (2013.01); *B28B 3/269* (2013.01); *B28B 11/14* (2013.01);
(Continued)

(58) Field of Classification Search
CPC ....... B29C 48/92; B29C 48/11; B29C 66/725; B29C 66/72525; B29C 66/7254;
(Continued)

(56) References Cited

U.S. PATENT DOCUMENTS 6,663,378 B2   12/2003   Grover et al.
6,991,448 B2   1/2006    Lubberts
(Continued)

FOREIGN PATENT DOCUMENTS

CN    102331424 A    1/2012
EP      587304 A1    3/1994
(Continued)

OTHER PUBLICATIONS

PCT Search Report and Written Opinion; International Searching Authority; PCT/US2015/061728, dated Feb. 29, 2016, 14 Pages.
(Continued)

*Primary Examiner* — Stella K Yi
(74) *Attorney, Agent, or Firm* — Kurt R. Denniston (57) ABSTRACT

In-line inspection and control system to in-situ monitor an extrudate during extrusion. A light beam illuminates a line on the outside circumference of the extrudate skin recording the curvature. A master profile of the illuminated defect-free skin is recorded and compared to successive monitoring of the illuminated skin. Differences from the comparison indicate skin and/or shape defects. A real-time feedback to automatically adjust process control hardware reduces or eliminates the skin and shape defects based on the monitoring and comparison.

19 Claims, 4 Drawing Sheets (51) Int. Cl.
*G01N 21/952* (2006.01)
*B29C 48/92* (2019.01)
*B29C 48/11* (2019.01)
*B29C 48/12* (2019.01)
*B28B 11/14* (2006.01)
*B28B 11/24* (2006.01)
*B29L 31/60* (2006.01)
*G01N 21/956* (2006.01)
*B29C 48/30* (2019.01)
*B28B 3/20* (2006.01)

(52) U.S. Cl.
CPC ............ *B28B 11/243* (2013.01); *B29C 48/11* (2019.02); *B29C 48/12* (2019.02); *B29C 48/92* (2019.02); *G01N 21/952* (2013.01); *B28B 2003/203* (2013.01); *B29C 48/302* (2019.02); *B29C 2948/92114* (2019.02); *B29C 2948/92295* (2019.02); *B29C 2948/92428* (2019.02); *B29C 2948/92514* (2019.02); *B29C 2948/92609* (2019.02); *B29C 2948/92704* (2019.02); *B29C 2948/92904* (2019.02); *B29L 2031/608* (2013.01); *G01N 21/95692* (2013.01); *G01N 2201/06113* (2013.01)

(58) Field of Classification Search
CPC ..... B29C 44/505; B29C 44/507; B29C 44/60; B29C 44/605; B29C 48/001; B29C 48/0013; B29C 48/0015; B29C 48/0016; B29C 48/151; B29C 48/251; B29C 48/503; B29C 66/972
See application file for complete search history.

(56) References Cited

U.S. PATENT DOCUMENTS

| | | |
|---|---|---|
| 8,537,215 B2 | 9/2013 | Booth et al. |
| 8,641,942 B2 | 2/2014 | Breuer et al. |
| 9,393,716 B2 | 7/2016 | Beecher et al. |
| 2004/0164464 A1 | 8/2004 | Lubberts et al. |
| 2006/0002605 A1 | 1/2006 | Chang et al. |
| 2006/0163778 A1 | 7/2006 | Maziers et al. |
| 2010/0274525 A1 | 10/2010 | Zoeller, III |
| 2011/0052039 A1 | 3/2011 | Urabe et al. |
| 2011/0128370 A1 | 6/2011 | Booth et al. |
| 2011/0278753 A1* | 11/2011 | Breuer ................ B29C 48/06 264/40.1 |
| 2012/0133065 A1 | 5/2012 | Caffrey et al. |
| 2013/0300016 A1 | 11/2013 | Brew et al. |
| 2015/0142975 A1 | 5/2015 | Hong et al. |
| 2015/0210029 A1 | 7/2015 | Makino et al. |

FOREIGN PATENT DOCUMENTS

| | | |
|---|---|---|
| JP | 10244578 A | 9/1998 |
| JP | 2013024560 A | 2/2013 |
| WO | 2007105825 A1 | 9/2007 |
| WO | 2012137649 A1 | 10/2012 |

OTHER PUBLICATIONS

English Translation of CN201580074341.6 First Office Action dated Jan. 18, 2019, China Patent Office, 13 PGS.
Machine Translation of JP2017527731 Office Action dated Aug. 14, 2019, Japan Patent Office, 2 PGS.
European Patent Application No. 15808048.1 Office Action dated Jul. 24, 2020; 8 Pages; European Patent Office.

\* cited by examiner

METHODS OF IN-LINE EXTRUDATE INSPECTION AND FEEDBACK CONTROL FOR HONEYCOMB BODY MANUFACTURE

This application is a national stage application under 35 U.S.C. § 371 of International Application No. PCT/US2015/061728, filed on Nov. 20, 2015, which claims the benefit of and priority to U.S. Provisional Patent Application Ser. No. 62/083,990 filed on Nov. 25, 2014, the contents of these applications are relied upon and incorporated herein by reference in their entireties.

BACKGROUND

Field

Exemplary embodiments of the present disclosure relate to methods of manufacturing honeycomb bodies and, more particularly, to inspection of extruded honeycomb bodies and control of extruding honeycomb bodies.

Discussion of the Background

After-treatment of exhaust gas from internal combustion engines may use catalysts supported on high-surface area substrates and, in the case of diesel engines and some gasoline direct injection engines, a catalyzed filter for the removal of carbon soot particles. Filters and catalyst supports in these applications may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters may be used in these applications.

The manufacture of ceramic honeycomb structures may be accomplished by the process of plasticizing ceramic powder batch mixtures, extruding the mixtures through honeycomb extrusion dies to form honeycomb extrudate, and cutting, drying, and firing the extrudate to produce ceramic honeycombs of high strength and thermal durability. The ceramic honeycombs thus produced are widely used as ceramic catalyst supports in motor vehicle exhaust systems, and as catalyst supports and wall-flow particulate filters for the removal of soot and other particulates from diesel engine exhausts.

Among the commercially successful processes for ceramic honeycomb manufacture are those that utilize large co-rotating twin screw extruders for the mixing and extruding of ceramic honeycomb extrudate. Ram extrusion, pressing, casting, spraying and 3-dimensional printing are other processes for ceramic honeycomb manufacture.

Once the wet honeycomb body has dried an inspection of the body can be conducted requiring labor, cost, and time. When a defect is found it may be too late to correct an extrusion process that caused the defect in sequential parts formed from the same extrudate in the same production run. The defects may be corrected requiring additional labor, time, and cost, or the production run may have to be scrapped if the defects are not repairable causing lost production and manufacturing inefficiencies.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide an in situ inspection system to monitor a honeycomb extrudate.

Exemplary embodiments of the present disclosure also provide a method of manufacturing an extruded ceramic honeycomb body.

Additional features of the disclosure will be set forth in the description which follows, and in part will be apparent from the description, or may be learned by practice of the disclosure.

An exemplary embodiment discloses an in situ system to monitor a honeycomb extrudate in an extrusion system for at least one defect. The system includes an inspection unit and a controller. The inspection unit includes a line illuminator and a detector. The line illuminator is configured to generate a line illumination on an outer peripheral surface of the honeycomb extrudate perpendicular to the honeycomb extrudate axial direction. The detector is configured to detect the line illumination scattered from the outer peripheral surface of the extrudate and generate a signal based on the detected line illumination. The controller is configured to receive the signal generated by the detector, compare the received signal to a previously stored defect free signal in real-time, and control at least one extrusion process parameter based on the comparison.

An exemplary embodiment also discloses a method of manufacturing extruded honeycomb bodies. The method includes extruding honeycomb extrudate in an axial direction and inspecting in situ the honeycomb extrudate. The inspecting includes illuminating a line of the honeycomb extrudate outer peripheral surface perpendicular to the axial direction, detecting the illuminated line scattered from the honeycomb extrudate outer peripheral surface, and generating a signal based on the detecting. The method includes comparing in real-time the signal with a previously stored signal of a defect free honeycomb extrudate inspection, and controlling at least one extruding process parameter based on the comparing.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

As used herein, "extrudate" refers to plasticized batch extruded through a die to form axially extending intersecting walls with channels there between. The channels can have cross sections of uniform or varying hydraulic diameter of various shapes, such as rectangular (square), hexagonal, other polygonal, circular, elliptical, other curved shapes, and the like, and combinations thereof. Extrusion can be by a continuous process such as a screw extruder, a twin-screw extruder, and the like, or by a discontinuous process such as a ram extruder and the like. In an extruder, an extrusion die can be coupled with respect to a discharge port of an extruder barrel, such as at an end of the barrel. The extrusion die can be preceded by other structure, such as a generally open cavity, screen/homogenizer, or the like to facilitate the formation of a steady plug-type flow front before the batch reaches the extrusion die.

The extrudate generally has a co-extruded, integrally formed, outer peripheral surface (skin) that extends in the axial direction. The extrudate outer periphery can have various cross sectional shapes such as circular, elliptical, polygonal, etc., and combinations thereof, either symmetrical or asymmetrical. The plasticized batch can comprise inorganic powders, inorganic binders, organic binders, pore formers, solvents, non-solvents and the like. After the plasticized batch is extruded through the die to form the extrudate, it can be cut, dried, and fired to form a porous ceramic honeycomb body or porous ceramic honeycomb body segment.

Figure 1:
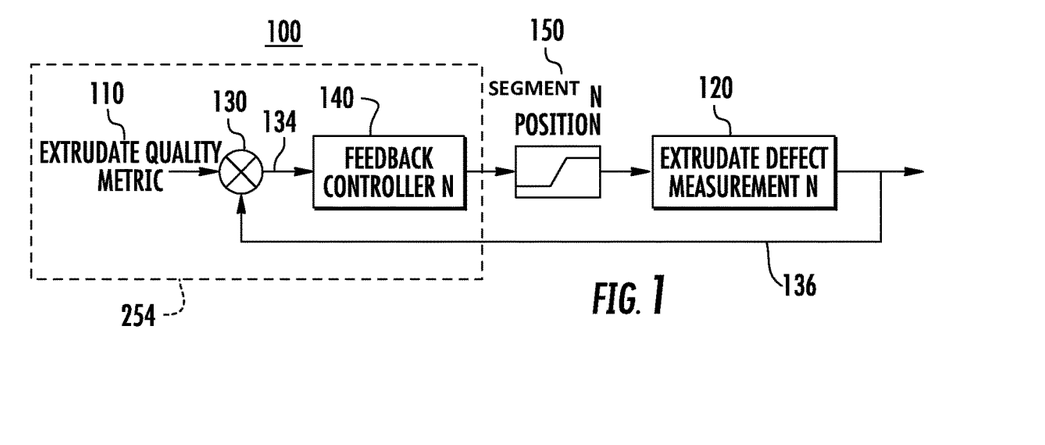
FIG. 1 is a schematic diagram of an extrudate control system to control the operation of an extrusion system according to exemplary embodiments of the disclosure.

FIG. 1 is a schematic diagram of an extrudate control system 100 to control the operation of an extrusion system according to exemplary embodiments of the disclosure. In the extrudate control system 100, an extrudate quality metric standard 110 is compared to an extrudate monitoring measurement 120 at operation 130. The extrudate quality metric standard 110 is a stored measurement of a defect free extrudate. The extrudate monitoring measurement 120 can measure in situ an extrudate quality metric such as skin quality and shape quality. That is, during extrusion the extrudate monitoring measurement 120 is performed. The comparison at operation 130 generates a comparison signal 134 in real-time. A measurement signal 136 based on the extrudate monitoring measurement 120 can be transmitted and used in the comparison at operation 130. A feedback controller 140 maintains extrusion hardware 150 settings or adjusts extrusion hardware 150 settings as a result of the comparison signal 134. Adjusting extrusion hardware 150 settings changes an extrusion process parameter.

The extrudate quality metric standard 110 is a measurement of an extrudate having defect levels below a threshold. Defects may be, for example, in deviation of the overall shape of the extrudate from the desired overall shape, such as bow, or in the co-extruded outer axial peripheral surface, such as defects in the co-extruded skin quality. When defects are below the threshold, the extrudate is referred to as defect free. The measurement can be conducted by the extrudate monitoring measurement 120 and stored in a non-transient median such as a computer hard drive. The extrudate monitoring measurement 120 can be conducted by an extrudate inspection system 230 (FIG. 2).

Figure 2:
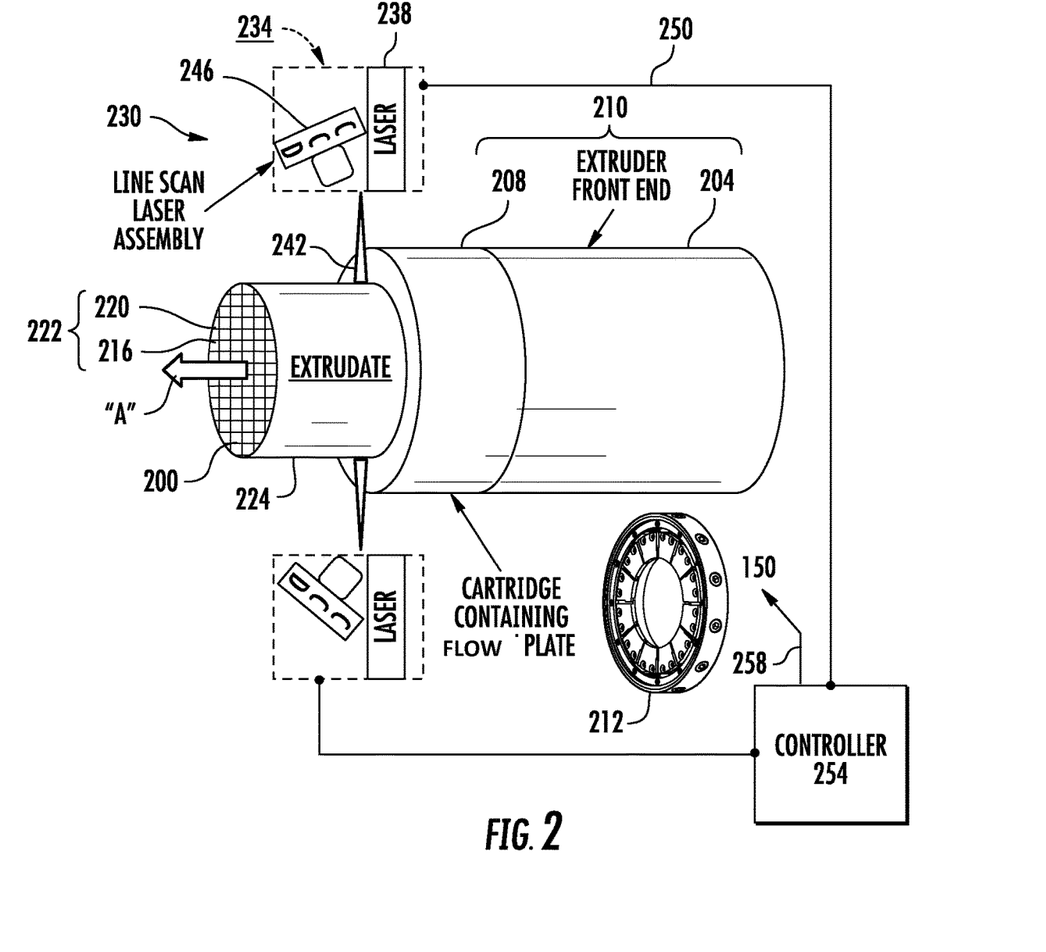
FIG. 2 presents a schematic of an extruder front end with an in-line inspection and control system according to exemplary embodiments of the disclosure.

FIG. 2 is a schematic of an extruder front end 204 with cartridge 208 and an in-line inspection and control system 230 according to exemplary embodiments of the disclosure. The extruder front end 204 and the cartridge 208 may be considered part of an extruder 210. The cartridge 208 can include a die and a flow plate 212 behind the die, that is, plasticized batch flows through the flow plate 212 prior to flowing through the die. The cartridge 208 can include additional hardware after the die, such as a varigap as described later in greater detail, the plasticized batch flows through the varigap hardware after flowing through the die.

Upon exiting the extruder 210 in direction of arrow "A" (axial direction), the plasticized batch stiffens into a wet extrudate 200 comprising a network of axially extending intersecting walls 216 (webs) that form axially extending channels 220 and an axially extending outer peripheral surface 224. The webs 216 and channels 220 comprise the matrix 222. Disposed at the outer periphery of the matrix 222 is the outer peripheral surface 224. The outer peripheral surface 224 may be referred to herein interchangeably as a co-extruded skin 224, an integrally formed co-extruded skin 224, or skin 224.

While the flow plate 212 has been described as disposed in the cartridge 208, this disclosure also covers embodiments where no flow plate 212 is disposed in the cartridge 208. That is, other hardware as described in more detail below may be used in combination with the flow plate 212 or without the flow plate 212 to change a process parameter. That is, at least one hardware component at the extruder front end 204 may be used alone or in any combination to change extrusion process parameters. Further, a process parameter may include extrusion pressure or temperature and may be used alone or in combination with one or more hardware components at the extruder front end 204 to change extrusion process parameters.

Upon extrusion from the front end 204 the extrudate 200 passes through in-line inspection and control system 230 according to exemplary embodiments of the disclosure. The in-line inspection and control system 230 can inspect the extrudate 200 in situ as the plasticized batch is extruded from the extruder 210. The in-line inspection and control system 230 can include an inspection unit 234 to inspect extrudate 200 surface 224 and overall extrudate shape quality. The inspection unit 234 can include a light source, such as a laser unit 238, to emit a light beam 242 and a detection unit 246, such as a charged coupled device (CCD) camera, to detect the light beam 242 scattered from the skin of the extrudate 200. The inspection unit 234 provides a signal 250 based on the detected light beam 242 scattered from the skin 224 surface. The in-line inspection and control system 230 can include a control unit 254 to receive the signal 250, analyze the signal 250, and transmit a control signal 258 to a process controller to control a process of the extruding system 210 in response to the analysis. For example, the process controller can be the flow plate 212 to control plasticized batch flow to the outer peripheral surface (skin) layer 224.

While the control unit 254 has been described as separate from the inspection unit 234, this disclosure is not so limited, that is, the control unit 254 may be included in the inspection unit 234. Further, any unit or module of the in-line inspection and control system 230 may be integral with any other unit or module thereof. For example, the control unit 254 may be integral with the detection unit 246. Also, well-known structures, materials, or operations are not shown or described in detail to avoid obscuring aspects of the disclosed subject matter. For example, the control unit 254 may include a storage device, a processing unit, power supply, and the like, and signals 250, 258 may be transmitted wirelessly, over cables, optical fiber, and the like, or combinations thereof.

As the extrudate 200 exits the extruder 210 in the axial direction indicated by arrow "A", it passes through the light beam 242 emitted from the laser 238. The light beam 242 illuminates a line on the periphery of the extrudate 224 perpendicular to the extrusion direction "A". As the extrudate 200 passes through the light beam 242 emitted from the laser 238 it is inspected by the inspection unit 234. The inspection unit 234 may include a plurality of lasers 238 and detection units 246. Accordingly, real-time inspection of extrudate 200 comprising wet skin 224 and wet matrix web 222 can be inspected as it exits the extruder 210 in these exemplary embodiments of the disclosure.

While described as the extrudate 200 passing through the light beam 242 in these exemplary embodiments, this disclosure is not so limited. That is, the extrudate 200 may be stationary and the inspection unit 234 may move axially past the extrudate 200 or some combination of extrudate 200 and inspection unit 234 movements may take place.

Figure 3:
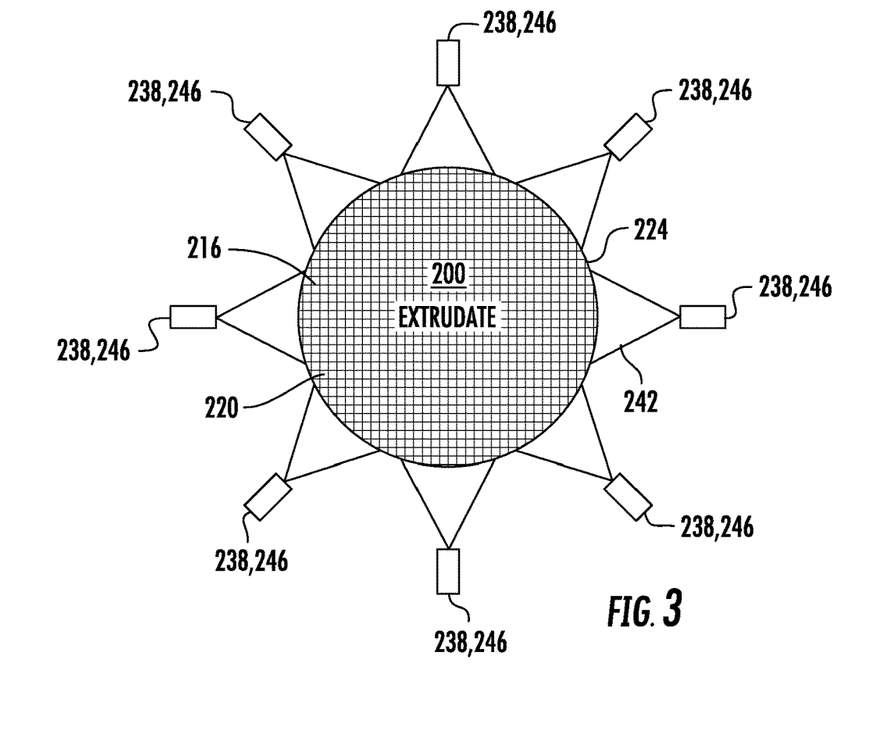
FIG. 3 shows a schematic top view of a projection of line lasers and detection units located to cover an outer surface cross section perpendicular to a longitudinal axis of a honeycomb extrudate according to exemplary embodiments of the disclosure.

FIG. 3 shows a schematic top view of a projection of eight line lasers 238 and detection units 246 located 45 degrees apart to cover an outer surface cross section perpendicular to a longitudinal axis of a honeycomb extrudate 200 according to exemplary embodiments of the disclosure. In these exemplary embodiments, the line lasers 238 may be co-planar or staggered (non-coplanar) and the detection units 246 may be co-planar or staggered (non-coplanar). The maximum and minimum extrudate 200 diameters for the line laser unit 238 and detection unit 246 arrangement illustrated in FIG. 3 can be Ø D8 and Ø D7, respectively. In an exemplary embodiment, D7 may be about 1.5 in (3.81 cm), and D8 may be about 17 in (43.18 cm). The arrangement of line laser units 238 and detection units 246 including number thereof, depends on size and shape of the extrudate 200 periphery 224 and desired circumferential resolution. While the distance around the outer periphery of the part is referred to as circumferential, this is for ease of description and is not intended to limit extrudate cross section to circular. In exemplary embodiments the circumferential resolution is sufficient to detect 1 mm wide skin defects and larger, for example, the circumferential resolution may be sufficient to detect 700 µm wide skin defects, 500 µm wide defects, 100 µm wide defects, 50 µm wide skin defects, 10 µm wide skin defects, or even 1 µm wide skin defects, where the width of the defect is in the circumferential direction, that is, the direction perpendicular to the axial direction regardless of the extrudate 200 shape.

In exemplary embodiments the circumferential resolution is sufficient to detect 1 mm shape defects and larger. Shape defects may be detected regardless of skin defects, that is, where there are no skin defects or where there are skin defects, the detection and control system 230 can determine deviations of the extrudate 200 shape from the defect free extrudate 200 shape. Shape defects can include, for example, bow, or shape deviation due to web 216 swelling or collapse. For example, the circumferential resolution may be sufficient to detect 700 µm wide shape defects, 500 µm wide defects, 100 µm wide defects, 50 m wide shape defects, 10 µm wide shape defects, or even 1 µm wide shape defects, where the width of the defect is in the circumferential direction, that is, the direction perpendicular to the axial direction regardless of the extrudate 200 shape.

The scan rate of the detection unit 246, which may be a laser profilometer comprising a charged coupled detector (CCD) camera and an optical filter in some exemplary embodiments, may be greater than about 1 kHz and thus nearly continuous measurement of the outside surface of the extrudate 200 is possible in these exemplary embodiments where extrusion speeds may be in the 0.3 to 12 inch/sec (0.7 to 31 cm/s) range. The laser profilometers may be rigidly mounted at a distance needed to cover a range of products of interest, for example about 1.5 inch (3.81 cm) to about 17 inch (43.18 cm) diameter round cylindrical extrudate. After the lasers 238 are mounted an ideal surface and shape can be captured, one that would indicate a perfect extrudate (defect-free). This profile can be captured and stored in a storage device as the master profile (extrudate quality metric standard 110) and used to compare against each successive measured profile. Each real-time measurement of the extrudate 200 has the master profile subtracted from it and then the length of each laser line is divided into sections, such as three. Combining the data from eight lasers would then produce 24 such sections covering the entire extrudate. However, the number of lasers and number of sections can be adjusted to meet the application. The analyzer of the controller 254 then searches across each of these subsections and calculates the largest deviation in the radial direction from the current measurement and the master profile and reports this value at the sampling rate of the system, for example, at 1 kHz. Thus 24 measurements representing the maximum radial defect measurement around the extrudate 200 can be reported to the controller 254 to be stored in a data archive system and used for active (real-time) control of the extrusion process.

The analyzer can be configured to receive the signal from the profilometer at greater than or equal to a frequency while the extruder 210 can be configured to extrude batch at an axial speed such that successive scans and transmissions are spaced apart by no more than 1 mm in the axial direction. For example, the laser profilometer can be configured to scan the illuminated line 242 and transmit the signal 250 to the controller 254 at greater than or equal to a frequency and the extruder 210 can be configured to extrude the extrudate 200 at an axial speed such that successive scans and transmissions are spaced apart by about 1 mm to about 50 µm in the axial direction "A". For example, the frequency can be in a range between about 20 Hz and about 2 kHz and the extruder 210 can extrude the extrudate 200 at an axial speed in a range between 2 mm/s and 100 mm/s. In these exemplary embodiments the axial resolution is sufficient to detect 1 mm long defects, for example, the axial resolution may be sufficient to detect 700 µm long defects, 500 µm long defects, 100 µm long defects, 50 µm long defects, or even 10 µm long defects, where the length of the defect is in the axial direction and the defects can be skin defects and overall shape defects.

Figure 4:
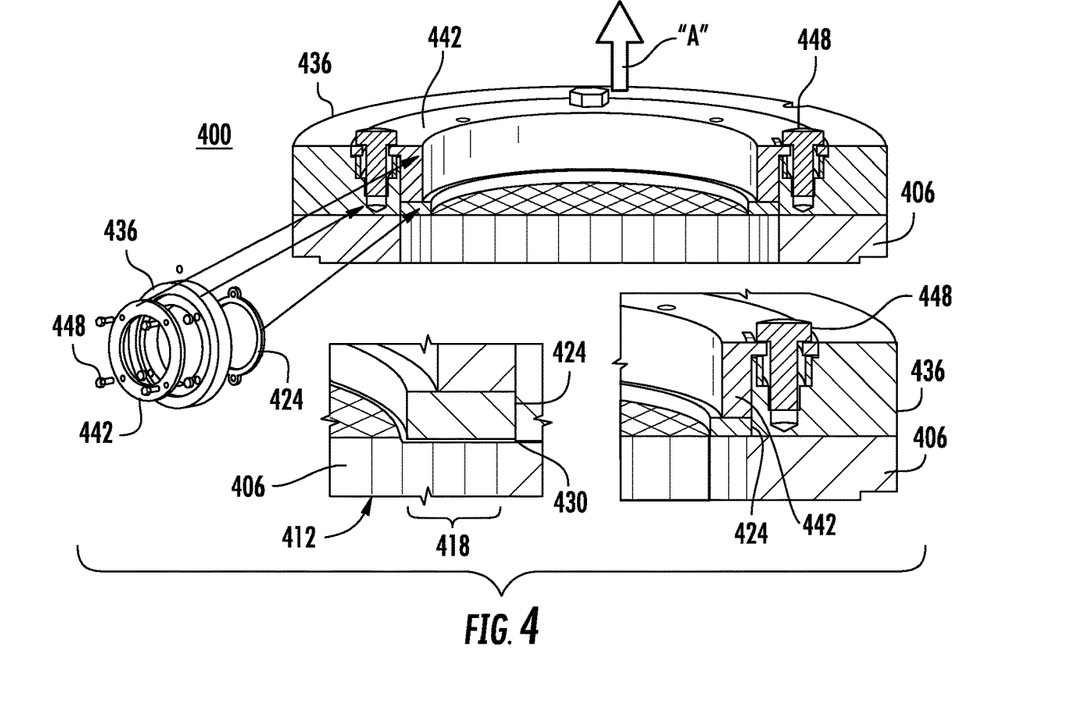
FIG. 4 is a schematic diagram of a variable shim thickness mask (varigap) process control hardware.

FIG. 4 is a schematic diagram of a variable shim thickness mask (varigap) hardware 400. The varigap 400 can be manipulated by the controller 254 to control an extrusion process according to an exemplary embodiment of the disclosure. The varigap 400 can be manipulated to control a peripheral gap to impact skin velocity as described in U.S. Patent Application 2013/0300016, the entire contents of which are incorporated by reference as if fully set forth herein. In brief, the varigap 400 is described with respect to the extrudate 200 flow in axial direction "A" through die 406 matrix slots 412 to form the matrix webs 222 of the extrudate 200 and peripheral slots 418 to form the skin of the extrudate 200. When extrudate from peripheral slots 418 encounter mask ring 424 in gap 430, the skin 224 is formed integral with the extrudate matrix 222. The varigap hardware 400 is configured to adjust gap 430 by movement of mask ring 424. For example, mask support 436 on the front of die 406 can support adjustment ring 442 by adjustors 448. Adjustors 448, for example, can be bolts, bosses, pistons, and the like that move adjustment ring 442 toward and away from die 406 in axial direction "A" to decrease and increase, respectively, gap 430 between mask ring 424 and the die face at peripheral die slots 418. Manipulation of adjustors 448 can be automatic using servo motors, hydraulics, pneumatics, and the like. When the varigap hardware 400 increases gap 430 the skin velocity exiting the mask ring 424 is reduced. Conversely, decreasing gap 430 increases skin velocity exiting the mask ring 424.

Figure 5:
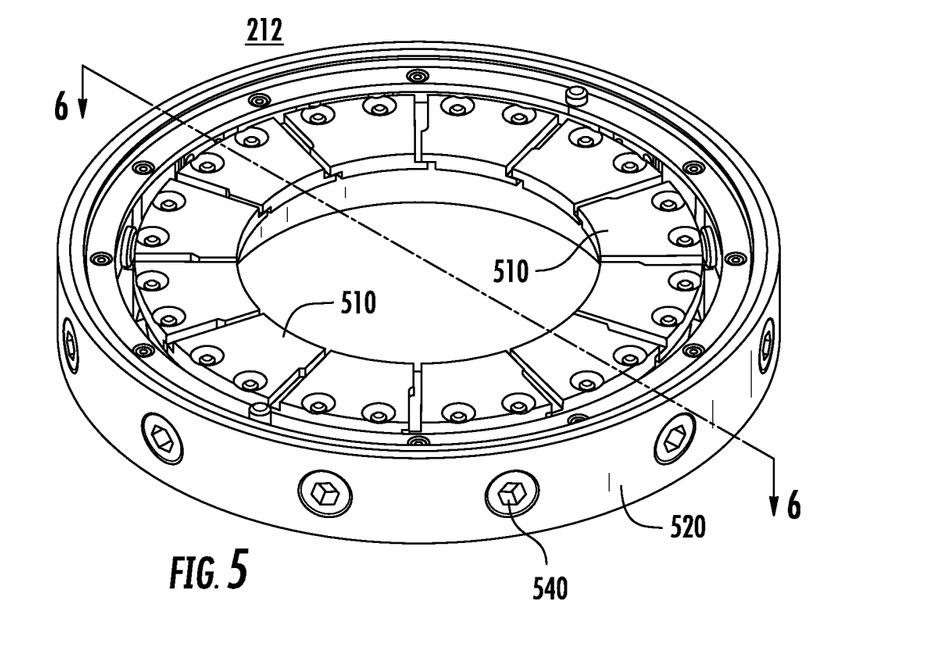
FIG. 5 is an isometric schematic diagram of an infinitely variable externally controllable flow plate (flow plate) process control hardware.
Figure 6:
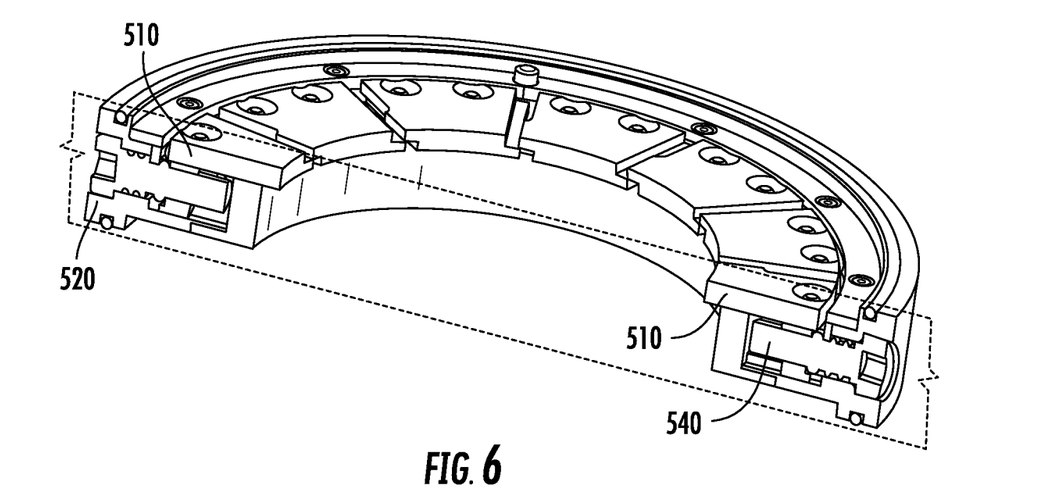
FIG. 6 is an isometric schematic diagram of a cross section through the flow plate of FIG. 5.

FIG. 5 is an isometric schematic diagram of an infinitely variable externally controllable flow plate (flow plate) 212 capable of adjusting differences in skin-body flow rates at multiple locations around the die 406, and allows for the external manipulation of the interior components controlling batch flow, during the production without having to stop manufacturing operations to effect the process changes. FIG. 6 is an isometric schematic diagram of a cross section through the flow plate 212 of FIG. 5. The flow plate 212 is a peripheral feed flow device as shown in FIG. 5 and FIG. 6. Flow plate 212 is composed of segments 510, for example, six to twelve, movably mounted on a ring 520. Segments 510 can be adjusted radially to the flow direction of the material batch by manipulation of adjustors 540. Adjustors 540, for example, can be bolts, bosses, pistons, and the like that move segments 510 radially, for example, by rotation manipulation of bolts 540.

Figure 7:
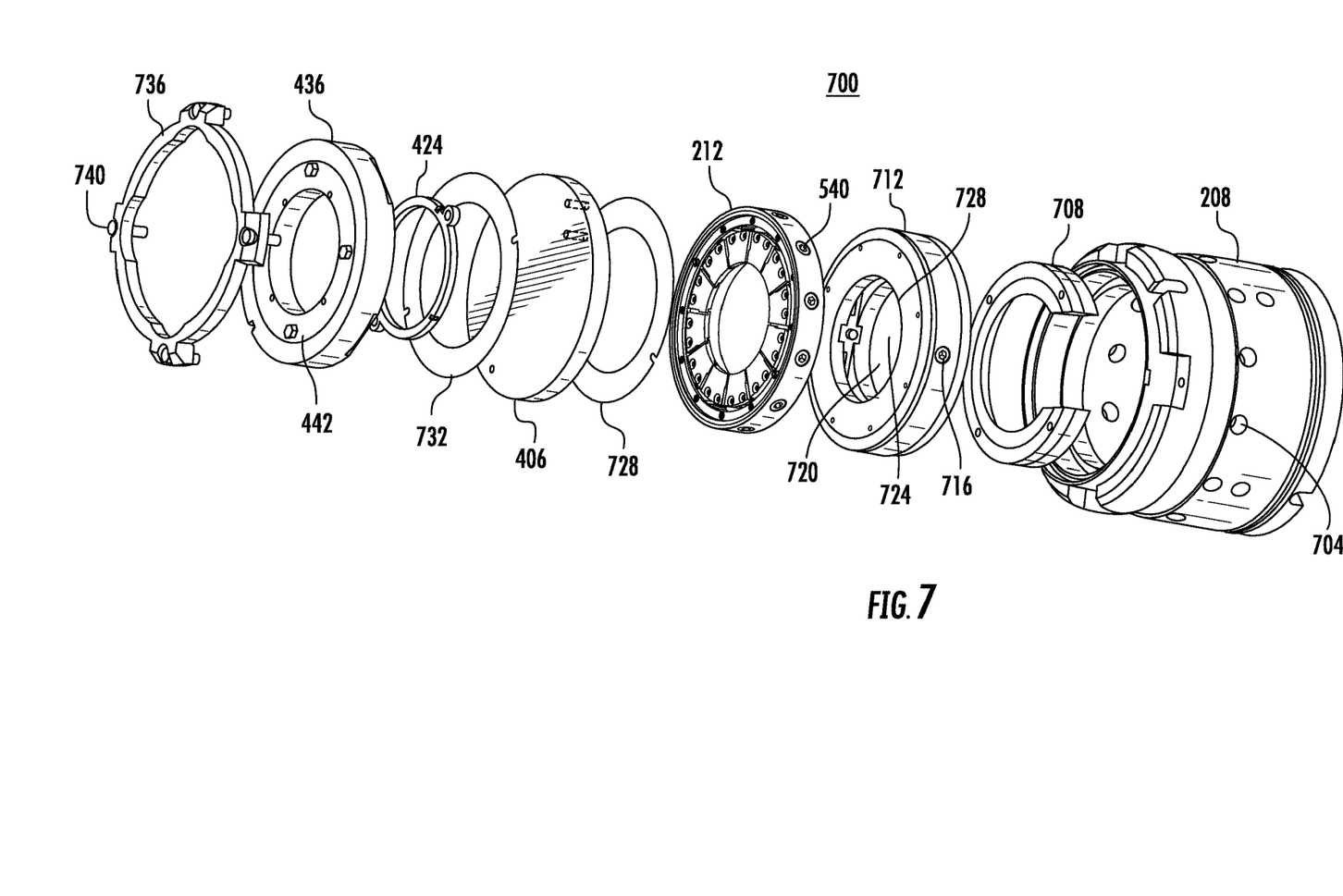
FIG. 7 shows an isometric schematic detail in exploded view of a cartridge that houses and supports hardware devices to control extrusion processes at an extruder front end.

The peripheral feed flow device (flow plate) 212 can be positioned upstream or adjacent inlet face of the die 406, as shown in FIG. 7, and acts to regulate the batch flow into the peripheral feed holes 418. Segments 510 can be adjusted to control flow of the batch in one or more of peripheral feed holes 418, and at one or more locations around die 406. Consequently, batch flowing into the gap 430 is also further controlled by peripheral feed flow device 212. The varigap assembly 400 and the flow plate 212 peripheral feed flow device act in combination to control the batch in the skin region of die 418.

FIG. 7 shows a schematic detail in exploded view of the cartridge 208 at extruder front end 204. The cartridge 208 can house and support the hardware devices 700 to control extrusion processes. The cartridge 208 can have access holes 704 to access adjustors on the process control hardware devices 700. Internal to the cartridge 208 an aperture ring 708 may be supported to provide a chamber space and aperture for the plasticized batch adjacent the extruder front end 204. Adjacent the aperture ring 708 an extrudate bow corrector apparatus 712 may be disposed.

Examples of extrudate bow corrector devices for correcting bow in a stream of extruded material are provided in U.S. Pat. No. 6,663,378, issued Dec. 16, 2003, U.S. patent application having Ser. No. 10/370,840 and Publication No. 2004/0164464, published Aug. 26, 2004, and U.S. patent application having Ser. No. 14/061,129, filed on Oct. 23, 2013, all of which are hereby incorporated by reference in their entireties as if fully set forth herein. The die 406 is composed of peripheral feed holes and central feed holes communicating at one end with an inlet face, and at the other end with a plurality of interconnected peripheral discharge slots 418 and central discharge slots 412, forming central pins and peripheral pins at an outlet (exit) face.

The bow deflector device 712 illustrated in FIG. 7 can include a base, a horizontal adjustment member 716, a horizontal connector, a vertical adjustment member, a vertical connector, and a bow plate. The bow deflector base has an aperture 720 through which flow of a plasticized batch or extrudate is attained. The bow plate is movably mounted to the base. The bow plate may be movably mounted to the downstream or upstream side of the base. The bow plate has an opening 724 defined by edge 728 adjacent the base aperture 720. The opening 724 can be directly adjacent the base aperture 720. The opening 724 can be a constant area and can be the same shape as the product being extruded. The opening 724 can be of the same or different size of the aperture 720, for example, the opening 724 can be smaller in size than the aperture 720. The bow plate blocks extrudate flow except extrudate flow through opening 724.

Horizontal adjustment member 716 located on a side of the base, controls a horizontal movement of the bow plate. The horizontal adjustment member 716 can be connected to a side of the bow plate. For example, the horizontal adjustment member 716 may be a bolt that pushes and pulls an outer peripheral edge of the bow plate. A similar vertical adjustment member may be located on a top of the base in FIG. 7, to control a vertical movement of the bow plate. For example, the vertical adjustment member may be a bolt that pushes and pulls an outer peripheral edge of the bow plate. The horizontal and vertical adjustment members 716 can be externally manipulated at openings 704. This allows for external manipulation during production without interruption thereof. The adjustment members 716 may be adjusted mechanically, for example rotation of screw threads on bolts as illustrated, or by pneumatic or hydraulic devices (not shown).

While terms, top, side, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Thus, the exemplary term "side" can become "top" and vice versa when the bow deflection device 712 in FIG. 7 is rotated 90 degrees counter clockwise.

The horizontal and vertical adjustment members 716 connect to the side and top of the bow plate, respectively, to move the plate in response to in-and-out movement of horizontal and vertical adjustment members 716. When the bow plate moves in a horizontal direction, opening 724 moves in a horizontal direction. Likewise, when bow plate moves in a vertical direction, opening 724 moves in a vertical direction. Accordingly, opening 724 can move horizontally and vertically relative to the base while maintaining a constant opening size (area) and shape. Changing the position of opening 724, not only affects the direction, but also the magnitude of bowing that can be corrected.

The position of the bow plate can be selected to achieve desired magnitude of bow correction, in any direction. For example, opening 724 in bow plate adjusted to an intermediate position to the right and down from center corrects down and right bow for a predetermined degree of bow correction.

The plasticized batch flows through the bow deflector device 712 prior to entering and passing through the die 406. As the plastic batch flows through the die 406, it does so having a unique flow velocity superimposed thereon as determined by the peripheral edge 728 of the opening 724 of the bow plate, and the position of the opening 724. This flow velocity gradient counteracts preferential flow in the die 406, resulting in equal batch flow throughout the die. Therefore, as the honeycomb extrudate 200 emerges from the die 406 it is absent of any bow in any direction. The bow deflector device 712 can be directly adjacent the die 406 or other intervening extrusion hardware devices may be present, such as a flow control device. For example, in FIG. 7, peripheral feed flow device (flow plate) 212 is illustrated disposed between the bow deflector device 712 and the die 406.

The bow plate can move anywhere within the constraints of the base by adjustment of vertical and horizontal adjustment members 716. The bow plate and bow plate opening 724 in an upper left position counters upper left bow in the extrudate 200. The bow plate and bow plate opening 724 in an upper right position counters upper right bow in the extrudate 200. The bow plate and bow plate opening 724 in a right position and the bow plate and bow plate opening 724 in a bottom position counter right bow and downward bow, respectively, in the extrudate 200. For example, the bow plate and bow plate opening 724 can move to these described positions by turning bolts of the vertical and horizontal adjustment members 716. When moved, the size and shape of the opening 724 can remain unchanged.

The opening 724 can be positioned to provide the most effective flow correction as required to provide for a straight extrudate, to counter the issues that prevent it from being straight naturally, with minimal impact on cross sectional shape of the extrudate. For example, when the extrudate cross sectional shape is an ellipse, the opening 724 can be an ellipse, or when the extrudate cross sectional shape is a circle, the opening 724 can be a circle.

As with the skin-forming assembly (varigap) 400, both the peripheral feed flow device (flow plate) 212 and the bow corrector device 712 are adjustable externally to the extrusion apparatus 210. Again, a suitable servo-motor, wrench, pneumatic, or hydraulic unit may be used to control the movement of bolts (adjustors) 540, 716, and obtain the desired settings for peripheral feed flow device 212 and bow corrector 712, respectively. Various shims 728, 732 may be present to hold the die 406 and a spider ring 736 secured with fasteners 740 may be used for retaining process control hardware 700 in cartridge 208.

In operation, the batch flowing towards the die 406 first encounters the bow corrector device 712 positioned to correct any degree of bow in the batch. Next, the exterior of the batch encounters the peripheral feed flow device 212 which acts to control the flow of the batch into the peripheral feed holes of the die. At the exit of the peripheral flow device 212 the batch enters the die 406, where it is extruded. The peripheral area of the batch encounters the skin-forming assembly 400 which controls both the amount of batch coming out of the peripheral discharge slots 418, and the skin thickness. Control of the various components of the extrusion apparatus can be made externally thereto. The resulting extruded structure 200, exiting the outlet end of the die 406, is a honeycomb 222 having an integral outer skin 224 formed thereon.

The controls architecture for the extruding process can respond to a quality metric to adjust critical system parameters like extrusion pressure, skin speed, and bow correction. The inspection method according to these exemplary embodiments allows the controller 254 to make adjustments to these parameters to maintain good skin quality, maintain good shape quality or reduce length of upsets thereby reducing waste and cost in the process.

This control method according to exemplary embodiments can be implemented either in a semi-automatic manner or in a fully automatic mode. In the semi-automatic mode, the controller 254 can use the data from the inspection unit 234 and compute the desired control move to be made and display the move in the control room where the operator can decide whether to make the suggested move or not. In the fully automatic mode, the controller 254 can make the moves automatically.

Extrusion of honeycomb bodies and honeycomb body segments with extruded skin is a complicated process. Skin forming and skin forming control have been described with reference to process control hardware 700 such as, the bow control apparatus 712, the peripheral feed flow device (flow plate) 212 flow hardware and the skin-forming assembly (varigap) 400. These process control devices work together to establish uniform skin flow around the product (extrudate 200) and uniform shape as it exits the extruder 210. Starting setup and adjustment to the process control hardware 700 can be performed to produce a uniform extrudate and defect free extruded skin.

Skin defects can include fast flow (ripples), air checks (skin tears due to slow flow), and fissures. Shape defects can include dents, grooves, and bow. Even when the process control hardware 700 is optimized, over time conditions in the extrusion can change (die wear, plasticized batch variations, extrusion pressure and temperature changes, etc.) which may introduce one or more of these defects. Once a defect is detected, for example by the inspection unit 234, a control strategy, for example, by the control unit 254, can be implemented to adjust the process control hardware 700 to re-establish skin and shape quality.

Exemplary embodiments of this disclosure allow the immediate detection of skin and shape defects and can provide location specific information to the process control hardware 700 such as, the bow control apparatus 712, the peripheral feed flow device (flow plate) 212 and the skin-forming assembly (varigap) 400 when the hardware is controlled by a servo type of motor which can be moved automatically. For example, a laser unit 238 can be focused on a specific location that corresponds to the different segments 510 in the flow plate 212 to control the skin quality in a determined location. Additionally, servo controlled bow control apparatus 712 and varigap 400 can use feedback from the inspection unit 234 to automatically correct for bow. Such a method can control the average bow to center the bow around 0 mm at all times.

The signal 250 provided by the inspection unit 234 can be location specific and can, for example, correspond to the alignment of the segments 510 in the flow plate 212. The controller 254 can use feedback on quality from the inspection unit 234 to drive a motor to move the flow plate 212 segment 510 into the batch flow stream to slow skin flow, or pulled out of the batch flow stream to promote skin flow. On the other hand, the signal 250 provided by the inspection unit 234 can be related to a uniform change around the extrudate 200 and correspond to adjustment of the varigap 400. The controller 254 can use feedback on quality from the inspection unit 234 to drive a motor to move the adjustment ring 442 of the varigap hardware 400 toward the die 406 in axial direction "A" to decrease gap 430 between mask ring 424 and the die face at peripheral die slots 418 to increase the skin velocity or away from die 406 in axial direction "A" to increase gap 430 between mask ring 424 and the die face at peripheral die slots 418 to decrease the skin velocity.

General Response Matrix:

According to exemplary embodiments of the disclosure, the in-line inspection and control system 230 can continuously monitor the extrudate 200 skin and shape quality during operation (in-situ) and provide continuous real-time feedback control to adjust the process control hardware 700 to optimize the plasticized batch flow around the extrudate automatically.

Fast Flow Skin:

When the plasticized batch speed through the peripheral die slots 418 is too great compared to the speed through the central discharge slots 412, it will cause the skin 224 to buckle; this fast flow skin will result in a skin measurement that is higher compared to a horizon type of target line in the extrudate quality metric standard 110 as determined by the control unit 254.

When fast flow skin is generally distributed uniformly around the extrudate 200 as detected by the inspection unit 234, the control unit 254 can control the varigap 400 to adjust the gap 430 to uniformly impact the skin flow. In a fast flow skin situation the adjustment ring 442 would be moved away from the die 406 face to open up the gap 430 flow cavity and reduce the skin velocity exiting the mask. If the gap 430 is opened up too much, air checks (as described in more detail below) can develop.

When the fast flow skin cannot be resolved with the varigap hardware 400 alone, the flow plate hardware 212 can be adjusted by the control unit 254. For fast flow skin, the segments 510 of the flow plate 212 can be pushed into the plasticized batch flow stream to slow the batch flow into the skin forming region.

When the fast flow skin is non-uniform around the peripheral region of the extrudate 200 (isolated to a portion of the peripheral region of the extrudate 200) as detected by the inspection unit 234, one segment 510 or a portion of the segments 510 located corresponding to the portion of the peripheral region of the extrudate having fast flow skin can be adjusted by the control unit 254. In this way, the extrusion process parameter can be controlled axially in line with the detected defect to correct the defect.

Air Checks:

When the plasticized batch speed through the peripheral die slots 418 is too low compared to the speed through the central discharge slots 412, it will cause the skin 224 to tear; this slow flow skin will result in a skin measurement that is lower compared to a horizon type of target line in the extrudate quality metric standard 110 as determined by the control unit 254.

The control unit 254 can adjust the extrusion process using the same process hardware devices 700 as described above for controlling fast flow skin. To control air checks, the opposite adjustments to controlling fast flow skin can be implemented. When air checks generally distributed uniformly around the extrudate 200 are detected by the inspection unit 234, the control unit 254 controls the varigap 400 to close the gap 430. If additional control is needed after the gap 430 is decreased, the segments 510 of the flow plate 212 can be moved out of the flow stream by the control unit 254 to promote more flow to the peripheral die slots 418 and the skin forming region.

Air checks distributed non-uniformly around the peripheral region of the extrudate 200 (isolated to a portion of the peripheral region of the extrudate 200) as detected by the inspection unit 234, can be corrected by the control unit 254 controlling one segment 510 or a portion of the segments 510 located corresponding to the portion of the peripheral region of the extrudate having the air checks. For air checks, the segments 510 of the flow plate 212 can be pulled out of the plasticized batch flow stream to allow faster batch flow into the skin forming region of the air checks. In this way, the extrusion process parameter can be controlled axially in line with the detected defect to correct the defect.

As described herein, the in-line inspection and control system 230 can monitor the outside surface 224 of the extrudate 200 during extrusion by projecting the light beam 242 to illuminate a line at various locations on the outside circumference of the skin 224 and recording the curvature of the line according to exemplary embodiments of the disclosure. A calibrated inspection unit 234 can take a snapshot of the illuminated skin 224 at a time when there is no observable skin or shape defect and record this snapshot as the master profile (extrudate quality metric standard 110). Successive snapshots in time can be compared with this master profile by the in-line inspection and control system 230 and differences between the master and the current profiles indicate skin and/or shape defects. Multiple inspection units 234 situated around the extrudate 200 can capture skin and/or shape quality measurements in determined locations, for example, axially in line with flow plate 212 segment 510 transitions. The captured monitoring data can be used by the control unit 254 to feedback in real-time to automatically adjust the process control hardware 700 to reduce or eliminate the skin and shape defects based on the comparison.

Advantages of the in-line inspection and control of an extrusion system provided in accordance with the present disclosure include: (1) real-time, instantaneous feedback on skin and shape quality that triggers immediate flow control response to reduce losses; (2) a more rigorous control algorithm and response than an manual operator dependent response; (3) detection to a finer detail of changes to skin flow than manual operator detectable, resulting in a more consistent skin and shape quality, resulting in a more consistent extrudate; (4) the more consistent skin quality provides a better isostatic test result and greater resistance to fissures; and (5) having extrudate shape quality information may provide information about the flow properties immediately out of the die.

According to exemplary embodiments of the disclosure, further advantages include: (6) detection of subtle dents or grooves can be improved via flow hardware adjustment or trigger a marking system to cut out the groove or dent from further processing into a defective honeycomb body or body segment; (7) automatic adjustors such as servo-motors controlled by controller 254 provide finer adjustment control over flow plate 212 segment 510 motion, bow plate motion and varigap 400 motion than a manual operation; (8) each segment 510 motion can be in a closed feedback control loop with a light source, such as a laser unit 238 and a detection unit 246, such as a charged coupled device (CCD) camera, in the inspection unit 234 in line with the flow plate 212 segment 510 for optimum efficiency; and (9) the in-line inspection and control unit 230 can continuously monitor the extrudate skin and shape quality during operation (in-situ) and provide continuous real-time feedback control.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. An in situ inspection and extrusion system to monitor a honeycomb extrudate during extrusion for at least one defect, the system comprising:
   an extruder comprising a front end from which the honeycomb extrudate is extruded;
   an inspection unit positioned proximate to the front end of the extruder, comprising:
      a line illuminator configured to generate a line illumination on an outer peripheral surface of the honeycomb extrudate perpendicular to the honeycomb extrudate axial direction as the honeycomb extrudate is being extruded from an extruder of the extrusion system, and
      a detector configured to detect the line illumination scattered from the outer peripheral surface of the extrudate and generate a signal based on the detected line illumination; and
   a controller configured to receive the signal generated by the detector, compare the received signal to a previously stored defect free signal in real-time, and control at least one extrusion process parameter based on the comparison,
   wherein the system is configured to begin inspection by the inspection unit on at least a portion of the honeycomb extrudate extending from the front end of the extruder while the honeycomb extrudate is in the process of being extruded.

2. The in situ system of claim 1, wherein the comparison is configured to identify a bow in the honeycomb extrudate, and the control is configured to generate a bow plate position adjustment signal to correct the identified bow.

3. The in situ system of claim 1, wherein the comparison is configured to identify a fast flow skin of the honeycomb extrudate, and the control is configured to generate at least one of a varigap gap adjustment signal and a flow plate segment adjustment signal to correct the identified fast flow skin.

4. The in situ system of claim 1, wherein the comparison is configured to identify an air check in the skin of the honeycomb extrudate, and the control is configured to generate at least one of a varigap gap adjustment signal and a flow plate segment adjustment signal to correct the identified air check.

5. The in situ system of claim 1, wherein the line illuminator comprises a laser and the detector comprises a laser profilometer comprising a charged coupled detector (CCD) camera and an optical filter.

6. The in situ system of claim 5, wherein the laser profilometer is configured to scan the illuminated line and transmit the signal to the controller at greater than or equal to a frequency for a determined axial extrusion speed such that successive scans and transmissions are spaced apart by no more than 1 mm in the axial direction.

7. The in-situ system of claim 5, wherein the laser profilometer is configured to scan the illuminated line and transmit the signal to the controller at greater than or equal to a frequency for a determined axial extrusion speed such that successive scans and transmissions are spaced apart by about 1 mm to about 50 µm in the axial direction.

8. The in-situ system of claim 7, wherein the frequency is in a range between about 20 Hz and about 2 kHz when the extruder is configured to extrude the honeycomb extrudate at an axial speed in a range between 0.7 cm/s and 31 cm/s.

9. The in situ system of claim 1, wherein the inspection unit comprises a plurality of line illuminators and detectors, and the controller is further configured to receive a plurality of signals from the plurality of detectors.

10. The in-situ system of claim 9, wherein the inspection unit comprises the plurality of illuminators spaced evenly around the extrudate in a plane perpendicular to the axial direction and the plurality of detectors spaced evenly around the extrudate at least one of above and below the plane perpendicular to the axial direction such that the spatial resolution in a direction perpendicular to the axial direction of each detector is less than 500 µm on the outer peripheral surface of the honeycomb extrudate, and the controller is configured to receive a plurality of signals from the detectors corresponding to a portion of the outer peripheral surface illuminated by the respective detected line illumination.

11. The in-situ system of claim 10, wherein the controller is configured to control the at least one extrusion process parameter axially in line with a detected defect.

12. A method of manufacturing an extruded honeycomb body, comprising:
   extruding honeycomb extrudate in an axial direction from an extruder;
   inspecting in situ the honeycomb extrudate, comprising:
      illuminating a line of the honeycomb extrudate outer peripheral surface perpendicular to the axial direction of a portion of the honeycomb extrudate extending from a front end of the extruder as the honeycomb extrudate is in the process of being extruded from the extruder,
      detecting the illuminated line scattered from the honeycomb extrudate outer peripheral surface, and
      generating a signal based on the detecting;
   comparing in real-time the signal with a previously stored signal of a defect free honeycomb extrudate inspection; and
   controlling at least one extruding process parameter based on the comparing.

13. The method of claim 12, further comprising:
   drying the honeycomb extrudate;
   cutting the honeycomb extrudate; and
   firing the honeycomb extrudate to produce a porous ceramic honeycomb body.

14. The method of claim 12, wherein the comparing identifies a bow in the honeycomb extrudate, and the controlling generates a bow plate position adjustment signal to correct the identified bow.

15. The method of claim 12, wherein the comparing identifies a fast flow skin of the honeycomb extrudate, and the controlling generates at least one of a varigap gap adjustment signal and a flow plate segment adjustment signal to correct the identified fast flow skin.

16. The method of claim 12,
wherein the comparing identifies an air check in the skin of the honeycomb extrudate, and the controlling generates at least one of a varigap gap adjustment signal and a flow plate segment adjustment signal to correct the identified air check.

17. The method of claim 12, wherein
the illuminating a line of the honeycomb extrudate outer peripheral surface perpendicular to the axial direction comprises illuminating a plurality of co-planar lines on adjacent segments of the honeycomb extrudate outer peripheral surface,
the detecting comprises detecting the plurality of illuminated co-planar lines scattered from the honeycomb extrudate outer peripheral surface,
generating the signal comprises generating a plurality of signals corresponding to each respective detected co-planar line,
comparing the signal comprises comparing each of the plurality of signals to a previously stored defect free signal at the corresponding segment in real-time, and
controlling at least one extrusion process parameter based on the comparing.

18. A method of manufacturing an extruded honeycomb body, comprising:
extruding honeycomb extrudate in an axial direction from an extruder;
inspecting in situ the honeycomb extrudate, comprising:
illuminating a line of the honeycomb extrudate outer peripheral surface perpendicular to the axial direction as the honeycomb extrudate is being extruded from the extruder,
detecting the illuminated line scattered from the honeycomb extrudate outer peripheral surface, and
generating a signal based on the detecting;
comparing in real-time the signal with a previously stored signal of a defect free honeycomb extrudate inspection; and
controlling at least one extruding process parameter based on the comparing,
wherein the line illuminator is configured to scan the illuminated line and transmit the signal to the controller at greater than or equal to a frequency for a determined axial extrusion speed of the extrudate being extruded from the extruder such that successive scans and transmissions are spaced apart by no more than 1 mm in the axial direction.

19. The method of claim 18, wherein the frequency is in a range between about 20 Hz and about 2 kHz when the extruder is configured to extrude the honeycomb extrudate at an axial speed in a range between 0.7 cm/s and 31 cm/s.

* * * * *